(12) United States Patent
Ling et al.

(10) Patent No.: US 11,211,839 B2
(45) Date of Patent: Dec. 28, 2021

(54) VIBRATION MOTOR

(71) Applicant: AAC Technologies Pte. Ltd., Singapore (SG)

(72) Inventors: Fanghua Ling, Shenzhen (CN); Feng Tao, Shenzhen (CN); Xiaofeng Pu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 79 days.

(21) Appl. No.: 16/706,823

(22) Filed: Dec. 8, 2019

(65) Prior Publication Data

US 2020/0212745 A1 Jul. 2, 2020

(30) Foreign Application Priority Data

Dec. 30, 2018 (CN) .......................... 201822279206.9

(51) Int. Cl.
| | |
|---|---|
| *H02K 1/34* | (2006.01) |
| *H02K 11/30* | (2016.01) |
| *B29C 45/00* | (2006.01) |
| *H02K 33/00* | (2006.01) |
| *B06B 1/04* | (2006.01) |
| *H02P 25/032* | (2016.01) |

(52) U.S. Cl.
CPC .............. *H02K 1/34* (2013.01); *B06B 1/045* (2013.01); *B29C 45/00* (2013.01); *H02K 11/30* (2016.01); *H02K 33/00* (2013.01); *H02P 25/032* (2016.02)

(58) Field of Classification Search
CPC .......... H02K 1/34; H02K 11/30; H02K 33/00; H02K 33/18; H02K 33/02; H02K 33/16; B06B 1/04; B06B 1/045; B29C 45/00; H02P 25/032
See application file for complete search history.

(56) References Cited

U.S. PATENT DOCUMENTS

| | | | |
|---|---|---|---|
| 2015/0123498 A1* | 5/2015 | Yang | H02K 33/16 310/25 |
| 2015/0253583 A1* | 9/2015 | Cho | H04N 5/2257 348/360 |
| 2016/0082625 A1* | 3/2016 | Luukko | B29C 59/18 428/141 |
| 2016/0218607 A1* | 7/2016 | Oh | H02K 33/16 |

* cited by examiner

*Primary Examiner* — Naishadh N Desai
(74) *Attorney, Agent, or Firm* — W&G Law Group

(57) ABSTRACT

The invention provides a vibration motor includes a housing, a vibrator in the housing, a stator accommodated in the housing, and a number of elastic parts suspending the vibrator in the housing. One of the vibrator and the stator includes a magnetic circuit system, and the other includes a coil. The elastic part is in an H shape, each has a first fixation part fixedly connected with the magnetic circuit system, and two second fixation parts perpendicularly extending from two opposite ends of the first fixation part. In addition, an interval is formed between the two second fixation parts. The second fixation parts and the first fixation part are fixedly connected with the housing. Therefore, the amount of parts of the vibration motor is reduced, the structure of the elastic part is simple, the machining and forming are simplified, and the cost is lower.

8 Claims, 5 Drawing Sheets

VIBRATION MOTOR

FIELD OF THE PRESENT DISCLOSURE

The present invention relates to a vibration motor, particularly to a vibration motor used for portable consumer electronic products.

DESCRIPTION OF RELATED ART

With the development of electronic technology, portable consumer electronic products are more and more favored by people, such as mobile phones, handheld game consoles, navigation devices or handheld multimedia entertainment devices. These electronic products generally use vibration motors for system feedback, such as the call reminder, information reminder and navigation reminder of mobile phones, vibration feedback of game consoles, etc.

In relevant technologies, a vibration motor comprises a housing, a vibrating component, an elastic connection part which suspends and supports the vibrating component in the housing, and a limit block and/or damping foam arranged between the housing and the vibrating component to prevent the vibrating component from colliding the housing. On one hand, the vibration motor with the structure above has too many parts, which makes the assembling working procedure complex, and on the other hand, the elastic connection part is complex in structure, and has more processing working procedures and high processing cost.

Thus, it is necessary to provide an improved vibration motor to solve the problems above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
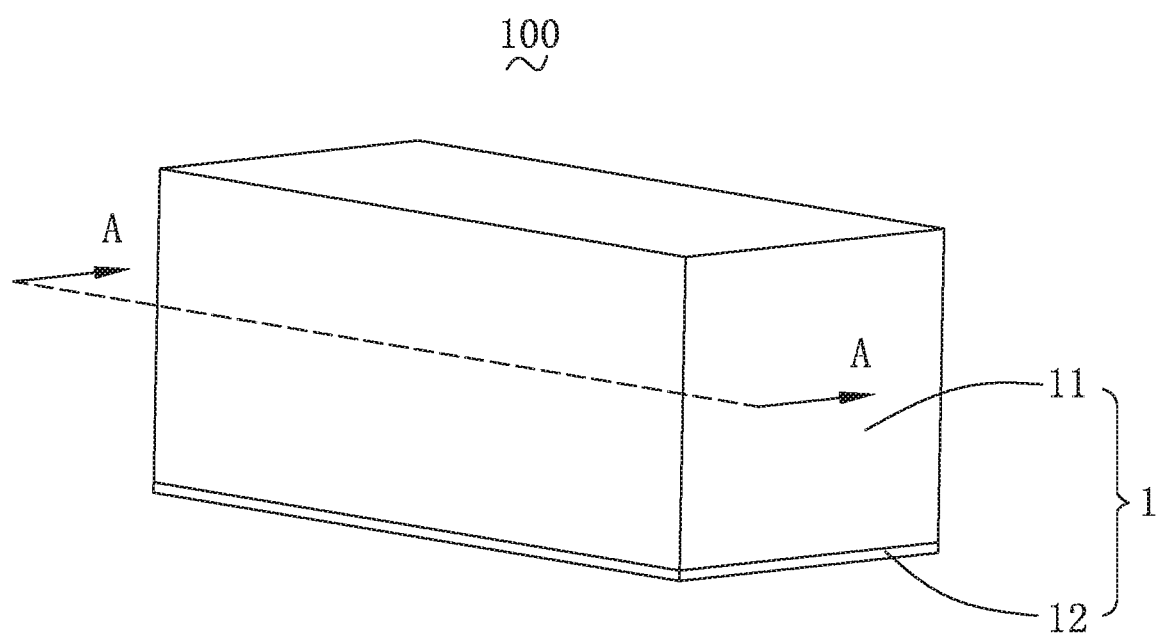
FIG. 1 is an isometric view of a vibration motor in accordance with an exemplary embodiment of the present invention.
Figure 2:
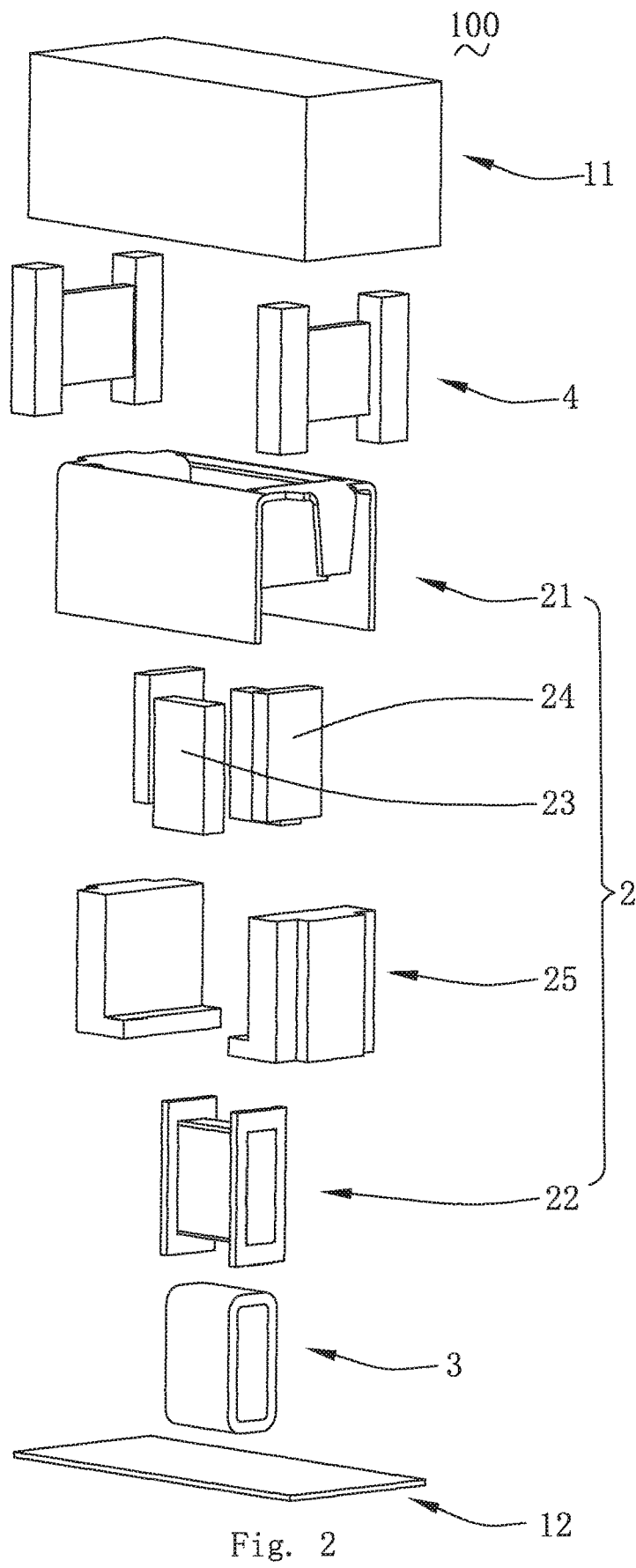
FIG. 2 is an exploded and isometric view of the vibration motor in FIG. 1.
Figure 3:
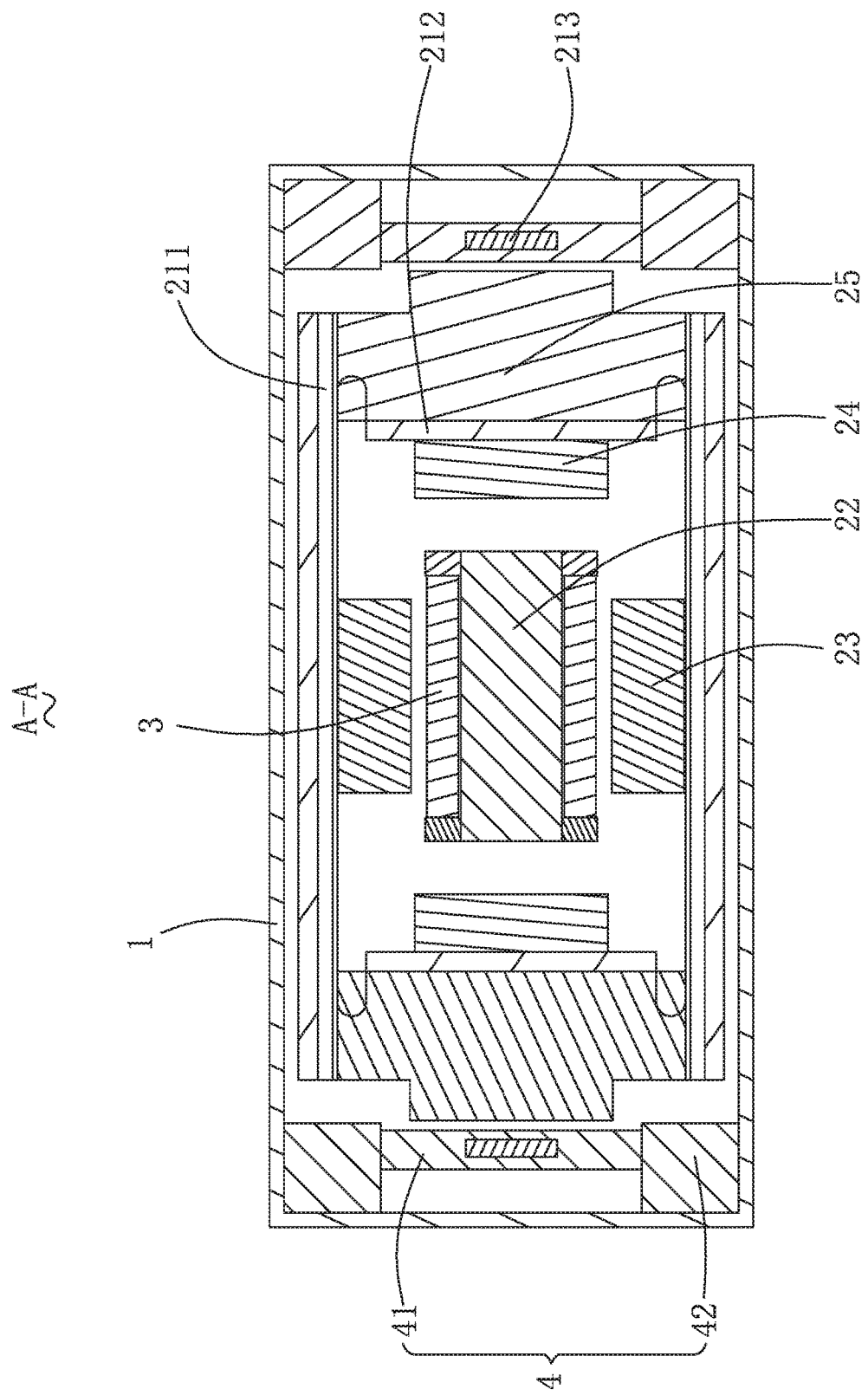
FIG. 3 is a cross-sectional view of the vibration motor, taken along line A-A in FIG. 1.
Figure 4:
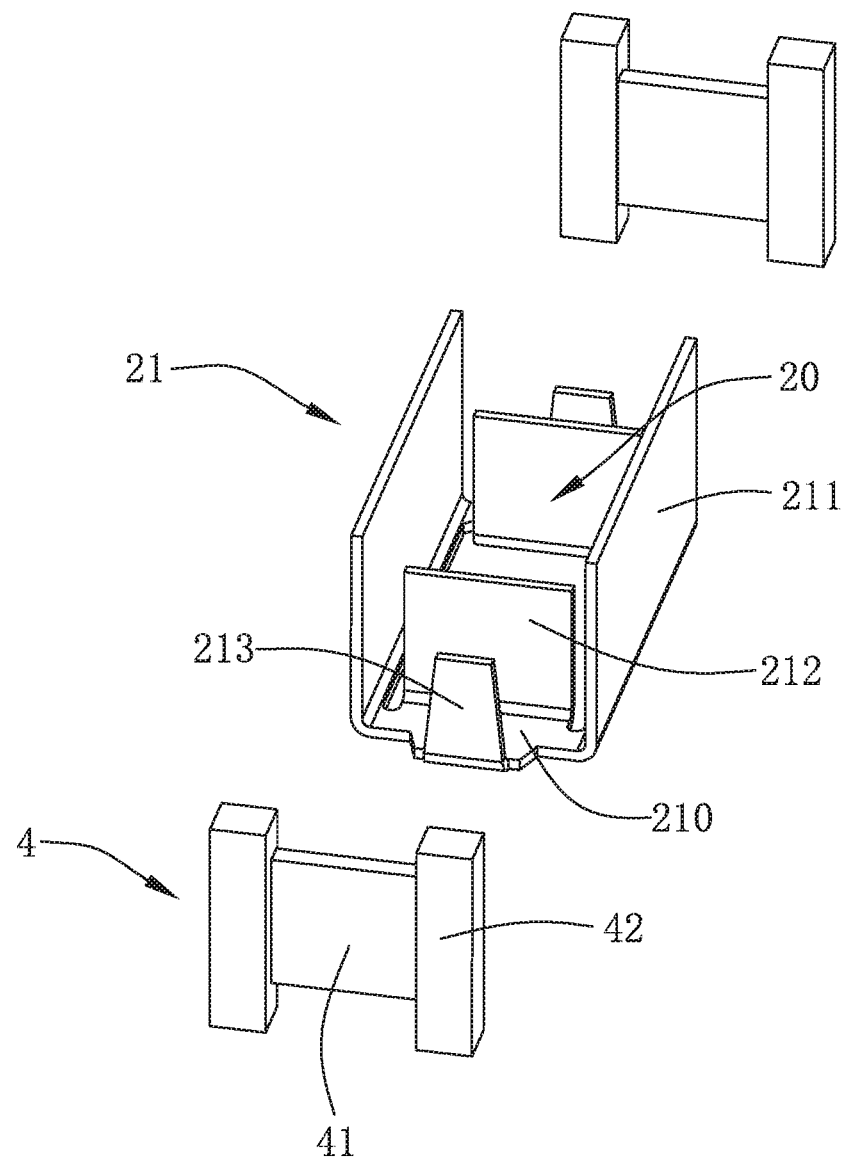
FIG. 4 is a disassemble view of an elastic part and a support of the vibration motor.
Figure 5:
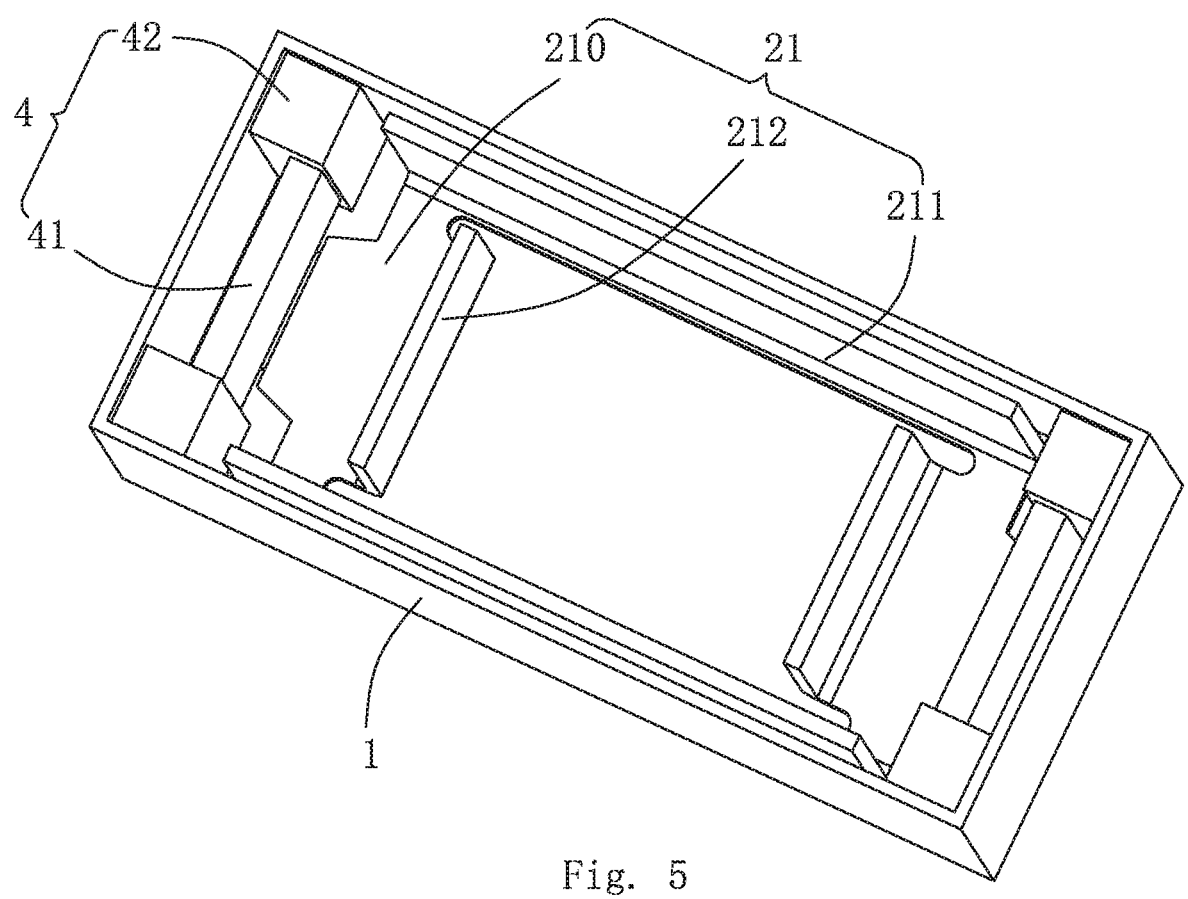
FIG. 5 is an assembled view of the elastic part, the support and a housing of the vibration motor.

Please refer to FIGS. 1-5, an embodiment of the present invention provides a vibration motor 100. The vibration motor 100 comprises a housing 1, a vibrator accommodated and fixed in the housing 1, a stator driving the vibrator to vibrate, and two elastic parts 4 suspending the vibrator in the housing 1.

The housing 1 comprises a housing 11 and a cover plate 12 covering the housing 11.

Either the vibrator or the stator comprises a magnetic circuit system 2, and the other comprises a coil 3. For convenient description, in the embodiment, the vibrator comprises the magnetic circuit system 2, and the magnetic circuit system 2 comprises a support 21 with an accommodation chamber 20, two first magnets 23 and two second magnets 24 accommodated in the accommodation chamber 20, and two weights 25. The stator comprises the coil 3 and an iron core 22 accommodated in the accommodation chamber 20. The coil 3 winds the iron core 22. The coil 3 and the magnetic circuit system 2 interact with each other to drive the vibrator to vibrate.

Specifically, the support 21 further comprises an annular bottom wall 210, two first side walls 211 formed by vertically extending from the outer edge of the bottom wall 210, two second side walls 212 formed by vertically extending from the inner edge of the bottom wall 210 and two third side walls 213 formed by vertically extending from the outer edge of the bottom wall 210. The first side walls 211 are arranged along the long axis, and the second side walls 212 and the third side walls 213 are arranged along the short axis. The two first side walls 211 are arranged in parallel with an interval, the two second side walls 212 are arranged in parallel with an interval and vertical to the first side walls 211. The first side walls 211 and the second side walls 212 cooperatively enclose to form the accommodation chamber 20. The third side walls 213 and the second side walls 212 are arranged in parallel with intervals, and the bottom wall 210 of the second side walls 212 and the third side walls 213 is used for bearing the weights 25 and the elastic parts 4.

The two first magnets 23 and the two second magnets 24 are accommodated in the accommodation chamber 20, and are symmetrically arranged around the iron core 22. Specifically, the two first magnets 23 are symmetrically arranged and fixed to the two first side walls 211. The two second magnets 24 are symmetrically arranged and fixed to the two second side walls 212.

The two weights 25 are symmetrically arranged and are respectively located between the two second side walls 212 and the two third side walls 213.

The elastic parts 4 are in an H shape. Each elastic part 4 comprises a first fixation part 41 and two second fixation parts 42 vertically extending from two opposite ends of the first fixation part 41. The two second fixation parts 42 are arranged in parallel with an interval. The first fixation part 41 is flat, and the second fixation parts 42 are in a cuboid cylinder shape. The first fixation part 41 is fixed on the bottom wall 210 between the second side walls 212 and the third side walls 213, and the first fixation part 41 abuts against the third side walls 213 to fix the third side walls 213. The first fixation part 41 is arranged with the second side walls 212 with intervals.

The space between the first fixation part 41 and the second side walls 212 is used for fixing the weights 25. The first fixation part 41 and the housing 1 are arranged with intervals along the length direction of the housing 1, and the second fixation parts 42 are fixed to the housing 1. One end of each second fixation part 42 is fixedly connected with the first fixation part 41 along the width direction of the housing 1, and the other end is fixed to the housing 1 thereby avoiding the direct contact between the support 21 and the housing 1, and therefore the support 21 is prevented from colliding and abrading the housing 1 during vibration, namely, the elastic parts 4 can also be used as limit blocks.

Preferably, the first fixation parts 41 and the second fixation parts 42 are integrated into a whole to simplify the processing shaping of the elastic parts 4, and therefore the cost is lowered.

Preferably, the elastic parts 4 are made from a flexible organic material which itself has the damping function and replaces the traditional foam or magnetic fluid, and therefore the elastic parts 4 can both fix and limit the vibrator so as to reduce the number of parts of the vibration motor 100, as a result, the vibration motor 100 has a simpler overall structure, and the assembling working procedures are simplified.

When assembling, at first, injection molding is carried out to the first fixation parts 41 of the elastic parts 4 and the support 21 for fixing, and then the second fixation parts 42 of the elastic parts 4 are glued with the housing 1 for fixing, and at last, the other parts of the vibration motor 100 are assembled.

Compared with relevant technologies, the vibration motor provided by the present invention suspends the vibrator in the housing 1 with the H-shaped elastic parts 4, and the elastic parts 4 can both fix and limit the vibrator, which reduces the number of parts of the vibration motor 100, as a result, the vibration motor 100 has a simpler overall structure, and the assembling working procedures are simplified. In addition, the elastic parts are simple in structure, simplified for processing shaping and lower in cost.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor comprising:
   a housing;
   a vibrator in the housing;
   a stator accommodated in the housing;
   a plurality of elastic parts suspending the vibrator in the housing;
   one of the vibrator and the stator comprising a magnetic circuit system, and the other comprising a coil; wherein
   the elastic part is in an H shape, each comprising a first fixation part fixedly connected with the magnetic circuit system, and two second fixation parts perpendicularly extending from two opposite ends of the first fixation part; and wherein
   an interval is formed between the two second fixation parts; and the second fixation parts and the first fixation part are fixedly connected with the housing, the magnetic circuit system comprises a support with an accommodation chamber, and an iron core accommodated in the accommodation chamber and wound around by the coil; the first fixation parts are fixedly connected to the support, the support further comprises an annular bottom wall for bearing and fixing the first fixation parts, two first side walls vertically extending from an outer edge of the bottom wall, and two second side walls vertically extending from an inner edge of the bottom wall;
   the two first side walls are arranged in parallel with an interval, the two second side walls are arranged in parallel with an interval and vertical to the first side walls; the first side walls and the second side walls cooperatively enclose to form the accommodation chamber; the two elastic parts are arranged symmetrically to the two second side walls and fixed on the bottom wall.

2. The vibration motor as described in claim 1, wherein the first fixation part keeps a distance from the housing along a length direction of the housing; the second fixation parts abut against and are fixed to the housing; one end of each second fixation part is fixedly connected with the first fixation part along a width direction of the housing, and the other end of each second fixation part is fixed to and abuts against the housing.

3. The vibration motor as described in claim 1, wherein the first fixation parts and the second fixation parts are integrated formed as a whole.

4. The vibration motor as described in claim 1, wherein the elastic part is made from a flexible organic material.

5. The vibration motor as described in claim 1, wherein the support further comprises two third side walls vertically extending from the outer edge of the bottom wall;
   the third side walls and the second side walls are arranged in parallel with intervals; the first fixation parts of the elastic parts are fixed on the bottom wall between the second side walls and the third side walls; the first fixation parts abut against and are fix to the third side walls; the first fixation parts are arranged with intervals to the second side walls.

6. The vibration motor as described in claim 5, wherein the magnetic circuit system further comprises two first magnets and two second magnets accommodated in the accommodation chamber and arranged spaced from each other around the iron core, and two weights fixed on the bottom wall; the two first magnets are symmetrically arranged and respectively fixed to the two first side walls, the two second magnets are symmetrically arranged and respectively fixed to the two second side walls, and the two weights are symmetrically arranged and respectively between the two second side walls and the two first fixation parts.

7. The vibration motor as described in claim 1, wherein the first fixation parts and the support are fixedly connected with each other by injection molding.

8. The vibration motor as described in claim 1, wherein the second fixation parts are glued with the housing for fixing second fixation parts with the housing.

* * * * *